United States Patent
McVay et al.

(10) Patent No.: US 9,995,643 B2
(45) Date of Patent: Jun. 12, 2018

(54) DETECTION OF STATIC TIP RESISTANCE OF A PILE

(75) Inventors: Michael McVay, Gainesville, FL (US); Khiem Tat Tran, Gainesville, FL (US); Rodrigo Herrera, Tallahassee, FL (US); Peter Lai, Tallahassee, FL (US)

(73) Assignees: University of Florida Research Foundation, Inc., Gainesville, FL (US); Florida Department of Transportation, Tallahassee, FL (US)

( * ) Notice: Subject to any disclaimer, the term of this patent is extended or adjusted under 35 U.S.C. 154(b) by 546 days.

(21) Appl. No.: 13/982,045

(22) PCT Filed: Feb. 24, 2012

(86) PCT No.: PCT/US2012/026473
§ 371 (c)(1),
(2), (4) Date: Aug. 20, 2013

(87) PCT Pub. No.: WO2012/150983
PCT Pub. Date: Nov. 8, 2012

(65) Prior Publication Data
US 2013/0325367 A1    Dec. 5, 2013

Related U.S. Application Data

(60) Provisional application No. 61/446,664, filed on Feb. 25, 2011.

(51) Int. Cl.
*G01L 3/00* (2006.01)
*E21B 44/00* (2006.01)
*E21B 47/00* (2012.01)

(52) U.S. Cl.
CPC ............. *G01L 3/00* (2013.01); *E21B 44/00* (2013.01); *E21B 47/00* (2013.01)

(58) Field of Classification Search
CPC . G01L 3/00; G01L 3/108; E21B 44/00; E21B 47/00
(Continued)

(56) References Cited

U.S. PATENT DOCUMENTS 3,585,803 A * 6/1971 Bardgette ............. E21B 17/046
285/308
4,586,366 A   5/1986 Milberger
(Continued)

FOREIGN PATENT DOCUMENTS

JP      2006161363 A    6/2006
WO   WO 2009145897 A1 * 12/2009 ............... E21B 7/24

OTHER PUBLICATIONS

Hussein, M., Pile Driving Resistance and Load Bearing Capacity, Oct. 2008.*
(Continued)

*Primary Examiner* — Alexander Satanovsky
*Assistant Examiner* — Lina Cordero
(74) *Attorney, Agent, or Firm* — Alston & Bird LLP

(57) ABSTRACT

Systems and methods are provided for dynamically determining a static tip resistance of a dynamically-loaded component having a tip. One example method comprises receiving gauge data from one or more gauges associated with the component proximate the tip. The gauge data may represent measurements related to one or more impacts on the component. The example method may further comprise determining measured data and estimated data corresponding to the one or more impacts on the component based at least in part on the gauge data. Furthermore, the method may comprise performing an inversion to select the estimated data having the least amount of difference in comparison to
(Continued)

the measured data. The method may also comprise determining the static tip resistance based at least in part on the selected estimated data.

17 Claims, 14 Drawing Sheets

(58) Field of Classification Search
USPC .......................................................... 405/232
See application file for complete search history.

(56) References Cited

U.S. PATENT DOCUMENTS

| | | | |
|---|---|---|---|
| 4,813,815 A * | 3/1989 | McGehee | B63B 21/20 405/202 |
| 5,581,013 A | 12/1996 | Frederick | |
| 6,082,173 A * | 7/2000 | Wai | E02D 33/00 73/12.01 |
| 6,533,502 B2 | 3/2003 | McVay et al. | |
| 7,156,188 B2 | 1/2007 | Bermingham et al. | |
| 7,328,625 B2 | 2/2008 | Sundermeyer et al. | |
| 7,404,449 B2 | 7/2008 | Bermingham et al. | |
| 7,637,166 B2 | 12/2009 | Hecht et al. | |
| 8,382,369 B2 | 2/2013 | Piscsalko et al. | |
| 2003/0216894 A1 | 11/2003 | Ghaboussi et al. | |
| 2011/0056750 A1* | 3/2011 | Lucon | E21B 7/24 175/56 |
| 2011/0115639 A1* | 5/2011 | Hecht | E02D 5/34 340/815.4 |
| 2012/0031193 A1* | 2/2012 | Adams | G01L 25/00 73/804 |
| 2013/0128920 A1 | 5/2013 | Piscsalko et al. | |

OTHER PUBLICATIONS

Shahin, M., Applications of Artificial Neural Networks in Foundation Engineering, 2003, pp. 1-25.*
Briand, L.C., et al., "Stress Testing Real-Time Systems With Genetic Algorithms", GECCO '05 Proceedings of the 7th Annual Conference on Genetic and Evolutionary Computation, 2005, pp. 1021-1028, Canada.
Chou, J., et al., "Genetic Algorithm in Structural Damage Detection", *Computers & Structures,* Jun. 2001, pp. 1335-1353, vol. 79, Issue 14, Elsevier Science Ltd., Great Britain.
Lee, I., et al., "Prediction of Pile Bearing Capacity Using Artificial Neural Networks", *Computers and Geotechnics,* 1996, pp. 189-200, vol. 18, Issue 3, Elsevier Science Ltd., Great Britain.
Levin, R.I., et al., "Dynamic Finite Element Model Update Using Simulated Annealing and Genetic Algorithms", *Mechanical Systems and Signal Processing,* Jan. 1998, pp. 91-120, vol. 12, Issue 1, Academic Press Limited, United Kingdom.
The International Bureau of WIPO, International Preliminary Report on Patentability for International Application No. PCT/US2012/026473, Aug. 27, 2013, 5 pages, Switzerland.
International Search Report and Written Opinion for Application No. PCT/US2012/026473 dated Nov. 23, 2012.

* cited by examiner

BINARY MODEL PARAMETER CODE

| * | * | * | * | * | * | * | * |

$m_{ij} =$ 0 0 0 0 0 0 0 0   $\min_{ij}$
$m_{ij} =$ 0 0 0 0 0 0 0 1   $\min_{ij} + 1\Delta m_{ij}$
$m_{ij} =$ 0 0 0 0 0 0 1 0   $\min_{ij} + 2\Delta m_{ij}$
$m_{ij} =$ 0 0 0 0 0 0 1 1   $\min_{ij} + 3\Delta m_{ij}$
.
.
$m_{ij} =$ 1 1 1 1 1 1 1 1   $\max_{ij}$ $m_{ij}$ = $i^{th}$ model parameter for the $j^{th}$ event
$\min_{ij}$ = minimum value of the $i^{th}$ model parameter for the $j^{th}$ event
$\Delta m_{ij}$ = resolution of the $i^{th}$ model parameter for the $j^{th}$ event

FIG. 1a

CROSSOVER of Parameter

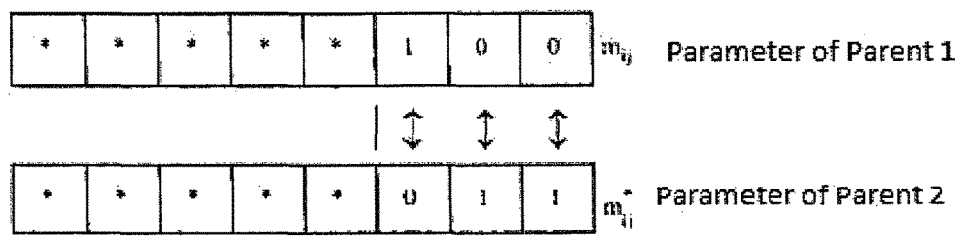

MUTATION of crossovered Parameter

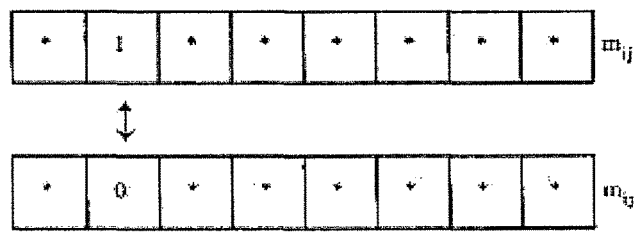

FIG. 1b

DETECTION OF STATIC TIP RESISTANCE OF A PILE

CROSS REFERENCE TO RELATED APPLICATIONS

This application is a national stage application, filed under 35 U.S.C. § 371, of International Application No. PCT/US2012/026473, filed Feb. 24, 2012, which claims priority to and the benefit of U.S. Provisional Application No. 61/446,664, filed Feb. 25, 2011, the contents of both of which are hereby incorporated by reference in their entirety.

GOVERNMENT SPONSORED RESEARCH OR DEVELOPMENT

This invention was made with government support under Project BDK-75-977-24 awarded by Florida Department of Transportation. The government has certain rights in the invention.

BACKGROUND OF THE INVENTION

Related Field

Various embodiments of the present invention pertain to the field of determining a static tip resistance of a dynamically-loaded component.

Description of Related Art

The use of dynamically-loaded components, such as piles, is common in many construction applications, including for both shallow foundations (e.g., for a house) and deep foundations (e.g., for bridges, large buildings, and any structures on poor soils). When driving the pile into a substrate (e.g., a soil surface), it is often important to determine various characteristics related to the driven component and the substrate. Current practices used to determine such characteristics commonly rely only on top instrumentation (i.e., strain transducers and accelerometers) to monitor piles during driving. In these instances, it becomes difficult to distinguish various characteristics from each other. For example, it is difficult to separate tip resistance from skin friction, which may be of great interest when considering scour, pile freeze, thin bearing layers, or difficult pile cross-sections.

Furthermore, current techniques do not provide a real-time assessment of static tip resistance when driving the pile into a substrate. Current approaches also suffer from various drawbacks due to the non-linear nature of the problem (i.e., variable loading stiffness, unloading, etc.) and the inherent noise in the measured data. The use of local inversion techniques (e.g., gradient methods) is heavily dependent on an initial model and prior information. In order to obtain a good inversion result, however, local inversion techniques require both a reasonable initial model and prior information that are not always available for a real-time solution.

Accordingly, it may be desirable to provide improved systems, methods, and apparatuses for dynamically determining a static tip resistance of a dynamically-loaded component to provide real-time or dynamic feedback during driving of the component.

BRIEF SUMMARY

Various embodiments of the present invention include methods for dynamically determining a static tip resistance of a dynamically-loaded component, such as a driven pile, or cast in situ foundation (e.g., auger cast pile, or drilled shaft). For example, the tip of a pile may be driven into a geological domain (e.g., subsoil or rock layer) for a load-bearing structure (e.g., a building or bridge). In general and according to one embodiment, a method for determining the non-linear static force (i.e., resistance) versus displacement of the pile tip may be determined in "real time" (e.g., one to five seconds) as the pile is being driven. By making a real-time determination, decisions may be made to cease pile driving, cut off the pile, or splice the pile prior to constructing a building, bridge, etc. In addition, designers may be able to better assess different capacities under service (e.g., dead and live loads) and extreme event conditions (e.g., impact, earthquake, etc.). In one aspect of the present invention, the method employs force equilibrium and conservation of energy using a genetic algorithm to determine the static tip resistance in response to a dynamic event (e.g., impact).

According to certain embodiments, one or more gauges (e.g., a strain gauge and/or accelerometer) may be associated with the pile (e.g., attached to the pile or embedded within the pile) proximate the pile tip. In example embodiments, data related to one or more impacts on the pile may be received from the one or more gauges. According to certain embodiments, a low-pass filter may be applied to the measured data to remove noise. The received gauge data may be used, according to certain embodiments, to calculate measurements related to the gauge data (e.g., the amount of energy reaching the pile tip or the amount of force at the pile tip) for each of the one or more impacts on the pile. According to some embodiments, the gauge data may also be used to estimate the individual component values (e.g., inertia energy, damping energy, static energy, inertia force, damping force, and/or static force) making up the total measured values.

According to various embodiments, one or more estimation models comprising estimated individual component values may be created based at least in part on randomly generated parameters (e.g., mass, viscous damping coefficient, and one or more stiffnesses corresponding to one or more segment lengths) and the gauge data. For example, each estimation model may estimate the individual component values for each of the one or more impacts that comprise the measured data corresponding to the respective impact based at least in part on the random parameters associated with the respective estimation model and the gauge data. In some embodiments, the estimated data for each impact of the estimation model may be compared to the measured data for the respective impact to determine a difference (i.e., an error). For example, the sum of the estimated energy data components (e.g., inertia energy, damping energy, and static energy) may be compared to the measured energy data to determine an energy error, and the sum of the estimated force data components (e.g., inertia force, damping force, and static force) may be compared to the measured force data to determine a force error.

In example embodiments, an inversion (e.g., a global inversion based on a genetic algorithm) may be performed on the estimated and measured data. According to certain embodiments, the inversion may comprise minimizing the error between the measured data and the estimated data. For example, a least-squared error method may be used. In certain embodiments using the least-squared error method, the square of the difference between the measured energy and the sum of the estimated energy components for each impact may be added; the square of the difference between the measured force and the sum of the estimated force components for each impact may be added; and the two totals may be combined to determine the error. According to some embodiments, a normalizing coefficient may be applied to the measured force and the estimated force components to balance the magnitude of the force to the magnitude of the energy. The least-squared method may be continued for each estimation model in the current generation of models, according to various embodiments. The number of models in the generation may be equal to the selected population for that generation, for example, 1-400, or more. In certain embodiments, a new generation may be generated according to the genetic algorithm using selection, crossover, and mutation based on the previous generation. This process may be repeated for any number of generations, for example, 1-100, or more.

According to various embodiments, the result of the inversion may be determined by selecting the estimation model of the final generation with the least error. In example embodiments, the individual component values of the measured data may be determined from the selected estimation model. For example, the static tip resistance may be determined from the selected estimation model by determining the static force of the estimation model, which corresponds to the static tip resistance.

In an example embodiment, a method for dynamically determining a static tip resistance of a dynamically-loaded component is provided. The dynamically-loaded component may comprise a tip. The method may further comprise receiving gauge data from one or more gauges associated with the dynamically-loaded component proximate the tip. The gauge data may represent measurements related to one or more impacts on the dynamically-loaded component. The method may also comprise determining measured data and estimated data corresponding to the one or more impacts on the dynamically-loaded component based at least in part on the gauge data. The method may further comprise performing an inversion to select the estimated data having the least amount of difference in comparison to the measured data. The method may also comprise determining the static tip resistance based at least in part on the selected estimated data.

In another example embodiment, a method for determining a static tip resistance of an object is provided. The method may comprise receiving data measured from an area proximate a tip of the object resulting from one or more impacts on the object. The data may represent at least one of a total force and a total energy associated with each of the one or more impacts. The method may also comprise generating a plurality of estimation models comprising one or more estimated component values of the data measured for each respective impact. The method may further comprise performing an inversion on the measured data and the estimated component values. Additionally, the method may comprise selecting a preferred estimation model. The total of the one or more estimated component values of the preferred estimation model may have the least amount of difference from the measured data of the plurality of estimation models. The method may also comprise determining the static tip resistance based at least in part on the selected preferred estimation model.

In another example embodiment, a system for dynamically determining a static tip resistance of a dynamically-loaded component is provided. The dynamically-loaded component may comprise a tip. The system may comprise at least one gauge disposed proximate the tip of the dynamically-loaded component. Furthermore, the system may comprise a transmitter in communication with the at least one gauge. The transmitter may be configured to transmit data measured by the at least one gauge, and the data may correspond to one or more impacts on the dynamically-loaded component. The system may further comprise a receiver configured to receive data from the at least one gauge. Additionally, the system may comprise a processor in communication with the receiver. The processor may be configured to determine measured data and estimated data corresponding to the one or more impacts on the dynamically-loaded component based at least in part on the received data, perform an inversion to select the estimated data having the least amount of difference in comparison to the measured data, and determine the static tip resistance based at least in part on the selected estimated data.

In yet another example embodiment, a method for inverting wave fields passing through a geological domain is provided. The method may comprise performing a global genetic inversion on measured surface data of the geological domain to determine layering and mean properties of the geological domain. The method may also comprise performing an iterative deterministic inversion based at least in part on the determined layering and mean properties of the geological domain to identify one or more anomalies within the domain. The method may further comprise terminating the iterative deterministic inversion after a residual error reaches a value below a predetermined threshold.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE FIGURES

Reference will now be made to the accompanying drawings, which are not necessarily drawn to scale, and wherein:

FIGS. 1a and 1b illustrate parameter coding, crossover, and mutation according to example embodiments of the present invention;

DETAILED DESCRIPTION OF VARIOUS EMBODIMENTS

Figure 2:
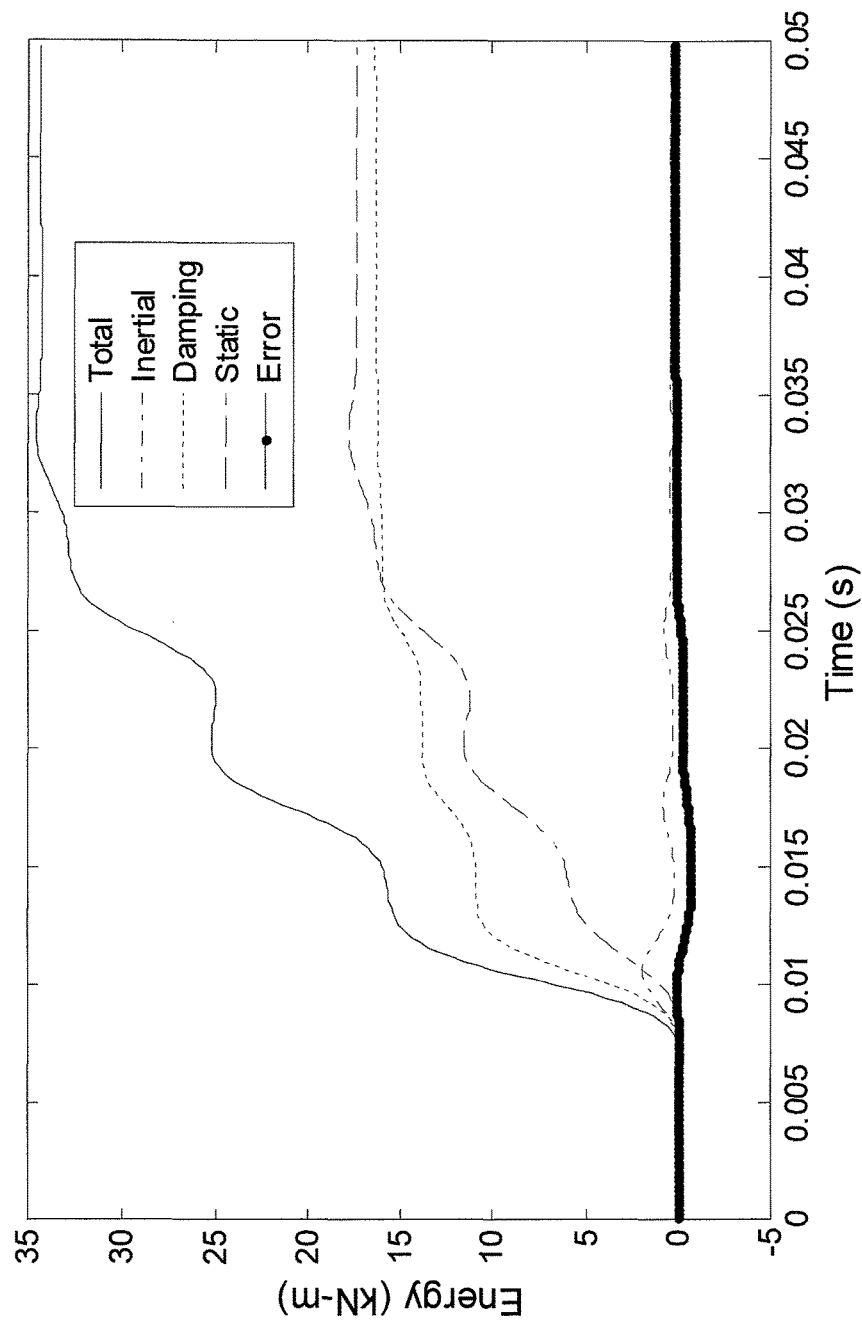
FIG. 2 shows a graph illustrating various component energy values related to a pile tip during a first example study according to one embodiment of the present invention.

Various embodiments of the present invention will now be described more fully hereinafter with reference to the accompanying figures, in which some, but not all embodiments of the inventions are shown. Indeed, these inventions may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. Like numbers refer to like elements throughout.

Embodiments of the present invention relate to techniques for estimating static tip resistance of a pile during driving from embedded strain and accelerometer data located at or proximate to the bottom of the pile. For example, the data may be obtained about one diameter from the bottom of the pile. In some embodiments, a nonlinear single degree of freedom system may be used to satisfy force and energy equilibrium with a global genetic inversion. By balancing force and energy from inertia, damping, and stiffness against the measured tip data, according to example embodiments, the unknown parameters (e.g., mass, damping, and nonlinear stiffness) may be estimated. Some embodiments may require a few seconds of analysis for each blow, though the technique may ensure a real-time assessment of static tip resistance as a function of displacement, which may be important when setting pile lengths.

It is understood that a "real-time" determination, as used herein, is not meant to be limiting and may refer to a determination that occurs simultaneously or temporally close to the action to which it relates. For example, a real-time determination of a force associated with an impact may be made at the same time as the impact or within a few seconds (e.g., about one to five seconds) or parts of a second from the time of the impact. It is to be understood that the amount of time between the action and the real-time determination may vary between embodiments.

Moreover, use of the terms "dynamically-loaded component," as used herein, is not mean to be limiting and may include a foundation, deep foundation, pile (e.g., a concrete pile), pier, column, drilled shaft, caisson, component, or the like that may be subjected to a dynamic load, force, impact, or the like. In some embodiments, the dynamically-loaded component includes a tip at the end of a pile that is driven into a geological domain.

Furthermore, use of the terms "proximate the tip" as used herein, is not meant to be limiting and may refer to a position that is at, close to, or near the tip of a pile or other driven component. For example, gauges associated with the dynamically-loaded component may be located at or proximate the tip. In one particular embodiment, proximate the tip is within about one diameter from the tip of the pile. In another particular embodiment, an element proximate the tip may refer to either an element external to the tip or embedded in or proximate the tip.

Use of the terms "geological domain," as used herein, is also not meant to be limiting and may refer to a geological region, layer, surface, or the like having specific characteristics or containing certain types of geological material. For example, a geological domain may include, but is not limited to, a subsoil region or a rock layer region.

As explained in further detail below, embodiments of the present invention have been evaluated in various example studies for driven pre-stressed concrete piles using data collected from pile driving operations with positive results. In particular, the effectiveness of the aforementioned techniques has been shown using four test piles at two bridge sites (i.e., Florida and Louisiana) during example studies. Mobilized static tip resistances were predicted in the example studies ranging from 400 to 1500 kilonewtons (kN) as a function of displacement. In the example studies, the predicted static resistance versus displacement compared favorably with measured values from static load tests. As shown in the example studies, the maximum recorded increase in tip resistance in silty to clayey sands may be less than 20% when piles are re-struck at times ranging from 2 to 30 days after initial drive.

According to one embodiment, a system for acquiring data may involve the use of internal pile sensors or gauges (e.g., strain & accelerometer) located at both the top and bottom of a pile, a wired transmitter or a wireless radio transmitter (e.g., a Bluetooth™ transmitter), a receiver in wired or wireless communication with the transmitter, and/or a processor configured to analyze the data. The pile may be positioned vertically or substantially vertically in some embodiments. For example, the processor may be a computer, laptop computer, or the like having software configured to perform the inversion techniques described herein. In some embodiments, the system may not require external wires (i.e., climbing of leads), may record information at both the top and the bottom of the pile, and/or may provide stresses and static capacity assessments in real time. The real-time provision of stresses and static capacity assessments, according to various embodiments, advantageously provide for setting pile lengths, assessing pile freeze, etc.

The current practice of using only the top instrumentation (i.e., strain transducers and accelerometers) to monitor piles during driving has been shown to require certain expertise in separating tip resistance from skin friction. Separation of side and tip static resistance may also be difficult when considering scour, pile freeze, thin bearing layers, or difficult pile cross-sections (e.g., large diameter cylinder piles). According to various embodiments of the present invention, the use of bottom gauges, which may give direct assessment of dynamic tip stresses along with residual and pre-stress levels, may provide an excellent means of separating static side resistance from tip resistance. Certain embodiments of the present invention may estimate static tip resistance using force equilibrium and conservation of energy from the measured dynamic tip data (i.e., strain and acceleration gauge data). One example system that may be employed for acquiring gauge data may be found, for example, in U.S. Pat. No. 6,533,502 which is incorporated herein by reference in its entirety. In certain embodiments, the static tip resistance estimates may require no further data beyond the measured dynamic tip data.

In certain embodiments, a real-time assessment of static tip resistance may be provided, which may require not only an efficient solution algorithm, but one which provides a unique and robust solution. According to various embodiments, a global inversion strategy may be used because of the non-linear nature of the problem (i.e., variable loading stiffness, unloading, etc.) and inherent noise in the measured data. The use of local inversion techniques (i.e., gradient methods) may be avoided due to their heavy dependency on an initial model and prior information. Moreover, in order to obtain a good inversion result, local inversion techniques may require both a reasonable initial model and prior information, which are not always available in real time. Unlike local inversion techniques, global inversion techniques attempt to find the global minimum of the misfit function by searching over a large parameter space. Most global inversion techniques are stochastic in nature and use global information to update the current position, and are thus likely to converge to the global minimum. According to one embodiment, a genetic algorithm may be employed because it may be used in cases where the model-data relationship is highly nonlinear and produces multimodal misfit functions.

To ensure the spirit of "real-time" solutions, in some embodiments the nonlinear behavior of a pile tip (Q-Z curve) may be modeled as a multi-linear curve to limit the number of unknowns. For example, the pile force versus displacement curve may be divided into unknown displacement segments ($l_i$), with constant unknown stiffnesses ($k_i$) over each segment, which may be estimated during the inversion. Therefore, according to example embodiments, the number of unknowns may be limited, for example to less than ten, and a solution may be achieved after minimal searching.

I. METHODOLOGY

According to example embodiments, the pile tip may be modeled as a single degree of freedom (SDOF) system, such as:

$$m\ddot{x}+c\dot{x}+kx=P(t), \quad (1)$$

where x is displacement and dots denote derivatives of the displacement with respect to time; P(t) is the dynamic force measured at the tip; and m, c, and k are the mass, viscous damping, and stiffness of the system, respectively.

For an individual hammer blow, the input energy arriving at the pile tip may be determined directly from the tip strain and accelerometer gauges. The input energy may be balanced by the inertia, damping, and static energy from the soil-structure interaction at the pile tip, such as:

$$\int (m\ddot{x}+c\dot{x}+kx)dx = \int P(t)dx. \quad (2)$$

To assist with the implementation of the integration, the integration variable may be changed to time, such as:

$$\int_t^{t+T} (m\ddot{x} + c\dot{x} + kx)\dot{x}\,dt = \int_t^{t+T} P(t)\dot{x}\,dt. \quad (3)$$

where T indicates a finite time interval.

In Equation 3, the unknown variables at the pile tip are m, c, and k. According, to certain embodiments, m may be the mass of pile and soil below the tip gauges moving with the tip, while the damping value, c, may be the viscous damping coefficient related to frequency of particle velocity, soil type, and magnitude of strain. In some embodiments, the stiffness, k, may not be a constant but rather a function of displacement (i.e., nonlinear). To limit the number of unknowns for a more efficient and consistent inversion, according to example embodiments, the pile's static tip force versus displacement (Q-Z curve) response may be modeled as a function of a plurality of linear displacement segments, for example having length $l_i$ and stiffness $k_i$ for segment i.

According to some embodiments, unknowns (m, c, $l_1$, $k_1$, $l_2$, $k_2$ . . . ) may be assessed from an inversion process to match or substantially match the measured input energy (right side of Equation 3) with the computed inertia, damping, and stiffness energies (left side of Equation 3). The estimated energies may be calculated, in certain embodiments, by assuming values of the unknowns and computing the left hand side of the Equation 3 using the acceleration, velocity, and displacement from measured tip data, which may be compared to the measured energy.

Also of interest are the times, $T_j$, where the velocity ($\dot{x}$) goes to zero. In these instances, the incremental energy change is zero (i.e., both sides of Equation 3 equal zero), but the force equilibrium applied at the pile tip, see Equation 4, readily reveals that the static resistance, $F_{static}(kx)$, is equal to dynamic force, P(t), minus the inertia force, $F_{static}(m\ddot{x})$.

$$F_{inertia}(m\ddot{x})+F_{damping}(c\dot{x})+F_{static}(kx)=P(t). \quad (4)$$

Moreover, in many instances where the velocity equals zero (i.e., zero damping force), the inertia force (acceleration) may also be zero. That is, both the velocity, $F_{damping}$ ($c\dot{x}$) and inertia force, $F_{static}(m\ddot{x})$ equal zero. In these instances, therefore, a direct assessment of static resistance may be possible due to the dynamic force, P(t), equaling the static resistance, $F_{static}(kx)$. As a result, various embodiments may consider both energy and force equilibrium at the pile tip in the inversion to increase accuracy and robustness of the solution.

II. INVERSION METHOD

According to various embodiments, inversion may involve minimizing a least-squared error, E(M), which may measure the difference between measured data and estimated data associated with a model M (i.e., a set of assumed values of the unknowns), as shown in the following equation:

$$E(M) = \frac{1}{N}\sum_{k=1}^{N} [d_k - g_k(M)]^2 + \frac{1}{N}\sum_{k=1}^{N} [D_k - G_k(M)]^2 \quad (5)$$

where $d_k$ and $g_k$ are respectively the $k^{th}$ measured and estimated energy, and $D_k$ and $G_k$ are respectively the $k^{th}$ measured and estimated normalized total forces. In certain embodiments, the magnitude of force may be twenty times the magnitude of energy, and "equal" goodness of fit may be required for both energy and force. Thus a normalizing coefficient (e.g., proportional to peak displacement) may be applied, according to example embodiments, to the total forces to ensure the same magnitude as the maximum observed energy. In Equation 5, N is the number of measured values, and E(M) is the least squared error (i.e., a value of zero occurs for a perfect match between the measured data and estimated data).

To overcome the need for a reasonable initial model and prior information, in some embodiments, a genetic algorithm may be applied to Equation 5 to obtain a global minimum. Genetic algorithms may be applied in evaluation of various dynamic data sets.

According to various embodiments, the algorithm may require a binary code (FIG. 1a), e.g., 8 bits, of 0 or 1, to represent each model parameter. For a code of nb bits: $\{a_{nb}, a_{nb-1}, a_{nb-2} \ldots a_1\}$ and user selected minimum, $\min_{ij}$, and maximum, $\max_{ij}$, values, for example, the parameter, $m_{ij}$, of the model M, may have the following resolution:

$$\Delta m_{ij} = \frac{max_{ij} - min_{ij}}{2^{nb} - 1}, \quad (6)$$

and the parameter's value may be determined by:

$$m_{ij} = min_{ij} + \Delta m_{ij} \sum_{n=1}^{nb} a_n \cdot 2^{n-1} \quad (7)$$

According to certain embodiments, the number of bits, nb, may be selected based at least in part on the expected range of the parameter and its desired resolution.

The genetic algorithm may begin, in some embodiments, with a suite of random models (for example, the first generation may have a population number of Np). Each parameter of a model in the first generation may be found, according to some embodiments, by randomly selecting a code of bits (0 and 1) and calculating the parameter value from Equation 7. In certain embodiments, the least-squared error of each model of the first generation may be determined from Equation 5.

According to various embodiments, the algorithm may generate offspring from the current parents by reproduction, which may consist of at least one of three operations: selection, crossover, and mutation. In example embodiments, updating may occur as follows:

1) A pair of models may be selected from the current generation for reproduction. The probability of parent selection may be based, for example, on the ratio of each model's inverse error to the sum of all inverse errors:

$$P_s(m) = \frac{\frac{1}{E(m)}}{\sum_A \frac{1}{E(m)}}, \quad (8)$$

where A denotes all models in the current generation. According to certain embodiments, two different models may be selected as parents.

2) The processes of crossover and mutation may be conducted for the selected two models in step 1. One parameter may be randomly selected, according to some embodiments, for the crossover and mutation (FIG. 1b) between each parent (i.e., parent 1 to parent 2). In these embodiments, the coded parameter selected may be subjected to the possibility of bit crossover with parents with a specified probability $p_x$. If crossover is to occur, in some embodiments, a cross position may be randomly selected and all the bits to the right of the position may be exchanged (FIG. 1b). A mutation may follow the crossover, in some instances, and may be simply the alteration of a randomly selected bit (FIG. 1b) in the parameter code based on a specified probability $p_m$, according to example embodiments. After the processes of crossover and mutation, in some embodiments, least-squared errors (Equation 5) may be performed on the conceived children.

3) The two new models generated in step 2 may be copied to the new generation, according to various embodiments. Each new model's error may be compared to the error of a model in the current generation selected under a uniform random selection and used only once. In instances where the new model's error is smaller, the new model may be kept in the new generation. Alternatively, in instances where the error is larger, the randomly selected model may replace the new model in the new generation with a probability $p_u$.

4) Steps 1, 2, and 3 may be repeated until a new generation is found with Np models. According to some embodiments, the least-squared errors of models in the new generation may be stored and used for generating the next generation.

According to various embodiments, generations may be created by repeating steps 1, 2, 3, and 4 until a specified number of generations are completed. The inversion result may be taken, for example, as the model of the final generation having the lowest least-squared error.

The selection of a population number Np may have significant effects on the outcome. For example, selecting too large a value may lead to unnecessary computations, whereas selecting too small a value may lead to a local solution. According to embodiments, having about 10 unknowns, many values of Np, (i.e., 100, 200, 300, and 400) may be evaluated. In the example studies described below 200 was found to be one possible Np value achieving good results. In embodiments having a population number of 200, the model parameters may begin to localize after 40 generations and converge after 100 generations. According to some embodiments, the mass and damping may converge the fastest (constant for all segments) with stiffness localizing last (highest change over the trace). In example embodiments, the ultimate static resistance (i.e., at peak displacement) may be insensitive to number of segments, initial stiffness, etc.

According to certain embodiments, the probabilities of crossover $p_x$, mutation $p_m$, and update $p_u$ may be selected to improve the global optimization in the genetic algorithm. For example, certain embodiments may select a low value of mutation probability (=0.01), a moderate value of crossover probability (=0.6) and a high value of update probability (=0.9).

For real-time solution speed and robustness, in some embodiments, the response may be divided into three loading and one unloading segments where the static tip stiffness may be assumed to be constant. Within any segment, in an instance in which the velocity and acceleration is zero, the static force (i.e., stiffness) may be known (i.e., equal to total tip force). In addition, due at least in part to the dynamic nature of the pile (i.e., positive and negative inertia forces), after approximately half the trace, in example embodiments, the inertia energy may be negligible and damping energy (function of c value) plus static energy (function of stiffness, k) may balance the applied tip energy. Solutions (e.g., force and energy) according to various embodiments may be completed with the genetic algorithm in about five seconds, for example, on a 3.4 GHz CPU computer.

III. EXAMPLE STUDIES

The following provides a summary of several example studies conducted according to various embodiments of the present invention. These studies should be considered non-limiting examples of certain embodiments of the present invention. In some of these non-limiting examples, the Florida Department of Transportation (FDOT) with the support of the Federal Highway Administration (FHWA) monitored (top and bottom) two 0.61 m square piles at a site in South Florida and tested static top down load of the piles. Similarly, the Louisiana Department of Transportation (LDOT) monitored (top & bottom) two 0.76 m square piles, which had been driven into silty sands, restruck up to one month later to assess pile freeze, and then static load tested. During the example studies, the tip resistance for all four piles at end of drive (BUD) and restrike were computed according to various embodiments of the present invention and compared with the measured tip resistance from the load tests provided by the FDOT and LDOT.

In the example studies, the developed algorithm of various embodiments was applied to the four full-scale piles at the two different sites with measured ultimate tip resistances varying from 400 to 1500 kN. The analysis of the example studies considered multiple blows near end of drive (BUD) as well as restrike blows occurring up to a month after EOD. According to the example studies, unlike skin friction, the increase of tip resistance was only on the order of zero to 20 percent. The estimated tip resistance of the example studies was subsequently compared to the measured resistance from the static load tests for verification purposes. According to certain embodiments, the proposed technique of example embodiments may be applied to any deep foundation (e.g., drilled shafts) subject to dynamic loading (e.g., Statnamic testing) where static tip resistance is needed.

a. Site 1

In the first example study, the site from which measured data was obtained is at SR 810, Dixie Highway at Hillsboro Canal in Broward County, Fla. The site consists of upper layers of approximately 15 m of medium dense sand with cemented sand zones underlain by limestone (bearing layer). The first pile analyzed (pile 1) during the first example study was a 0.61 m² by 15.2 m long pre-stressed concrete pile, driven to a depth 15 m below the ground surface by a single acting diesel hammer. Six days after installation, the pile was load tested to failure in accordance to ASTM D1143 (quick test) using two 500 ton hydraulic jacks. Re-strike blows were also conducted two days before and two days after the load test.

Various embodiments of the present invention were used to model 10 re-strike blows for comparison with one another and the measured tip resistance from the static load test. The results of one of the re-strike blows are presented here in detail for discussion.

Prior to running the inversion, measured data including strain and acceleration at the pile tip were low-pass filtered during the first example study to remove all components of frequencies higher than 200 Hz. By doing so, high frequency noise may be removed, reducing the number of local maxima and minima in the data, thereby facilitating a more efficient and consistent inversion. According to the first example study, the relationship of static tip resistance and displacement (Q-Z curve) was modeled by a multi-linear curve having three loading segments $(l_1, k_1, l_2, k_2, l_3, k_3)$ and one unloading segment $(k_4)$. Thus the total number of unknowns in this first example study was nine, including mass, damping, four stiffnesses, and three segment lengths.

In the first example study, the inversion began with a first generation of 200 random models. During inversion, the example embodiment allowed the mass to vary from 0 to 3000 kg, the damping to vary from 0 to 2000 kNs/m, and the stiffness to vary from 0 to 30,000 kN/m for loading and from 0 to 200,000 kN/m for unloading. During the first example study, one hundred generations were performed over about five seconds on a 3.4 GHz laptop with the solution having the lowest least-squared errors presented (among the models of the final generation).

Figure 3:
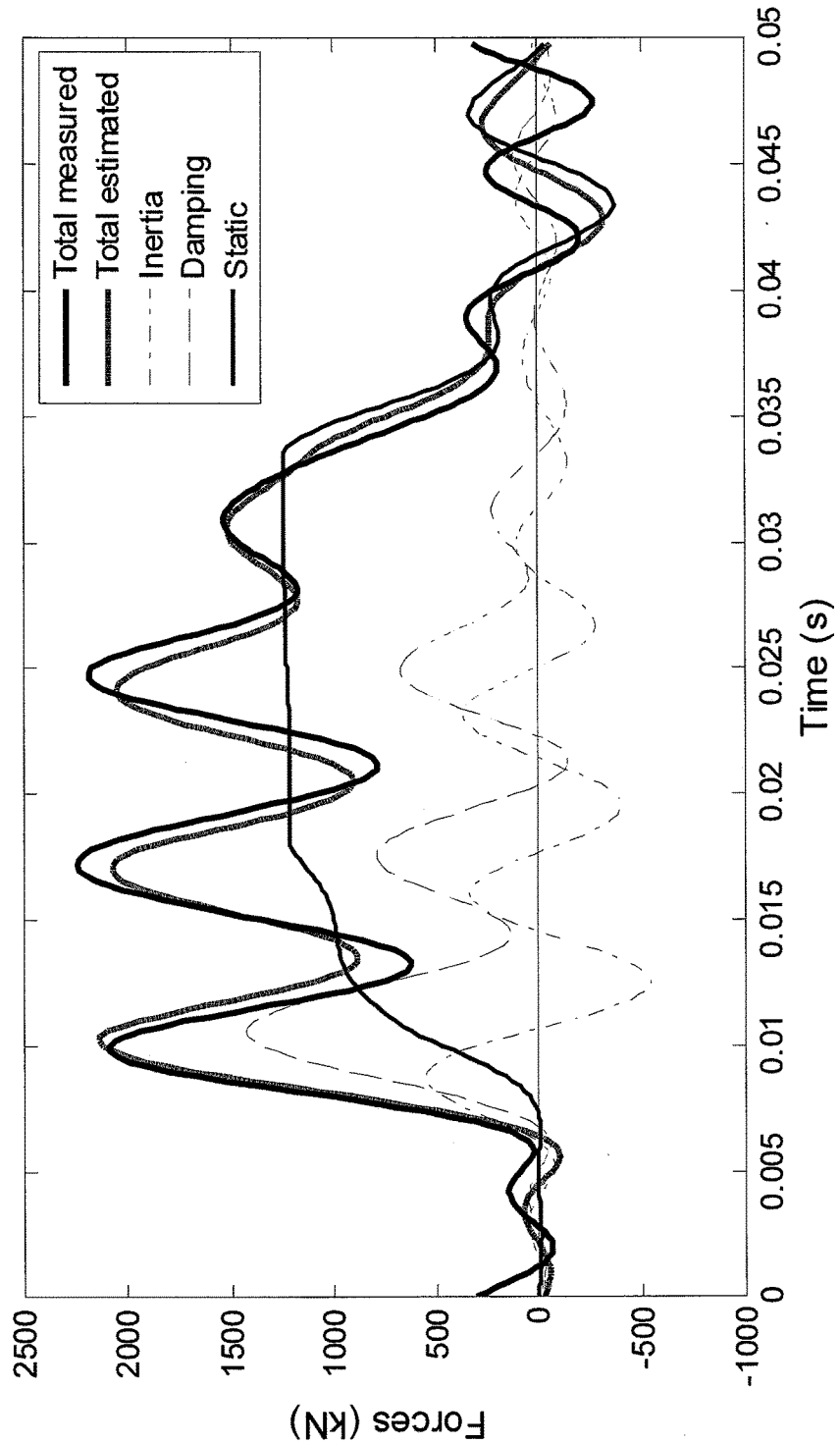
FIG. 3 shows a graph illustrating various component force values related to a pile tip during a first example study according to one embodiment of the present invention.
Figure 4:
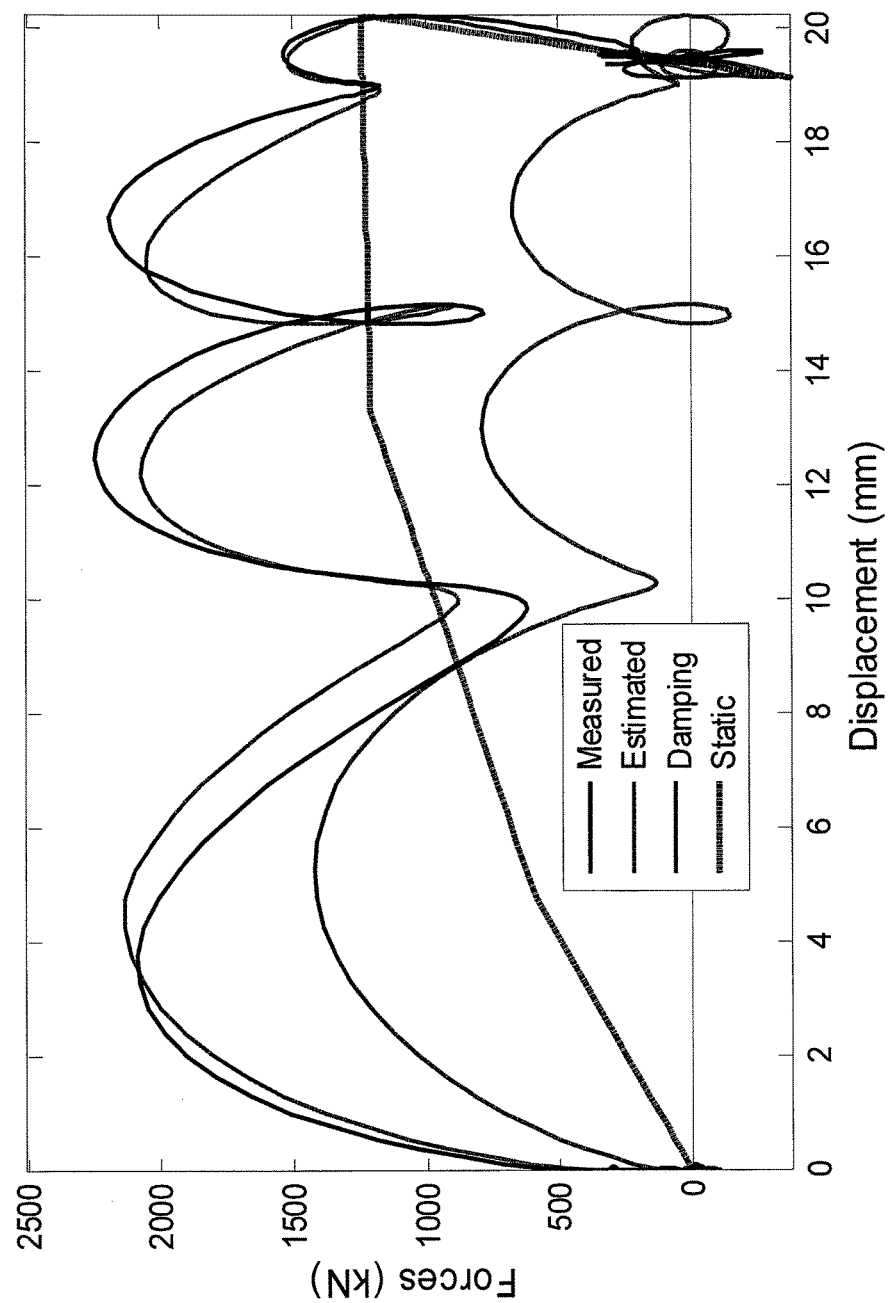
FIG. 4 shows a graph illustrating various component force values related to displacement of a pile tip during a first example study according to one embodiment of the present invention.

FIG. 2 presents the total energy arriving at the pile tip, during the first example study, as well as the predicted components due to inertia, damping, and static resistance, and the error (difference between the measured total energy, $$\int_{t}^{t+T} P(t)\dot{x}\,dt,$$

and the sum of predicted components). The first example study demonstrated nearly zero error, showing an excellent energy balance with time, especially for later points in the plot (i.e., total energy). Shown in FIG. 3 are the individual forces: inertia, damping, and static, as well as their sum versus the measured total force with time. As shown in the figure, the total estimated and measured forces match well for most of the points along the time axis in this example study. FIG. 2 demonstrates that, for typical tip accelerations (i.e., both positive & negative values, FIG. 3), inertia energies at the pile tip were small (positive & negative areas cancel); however, a significant portion of the input energy was consumed by damping and the nonlinear soil stiffness (i.e., movement of soil below the pile tip). Also demonstrated in FIG. 3 are a number of discrete times (e.g., 0.014 sec, 0.022 sec, 0.027 sec, etc.) where damping and inertia forces were negligible, and the static resistance was equal to the measured total force. FIG. 4 shows the estimated static force, damping force, predicted total force, and measured total forces as a function of the pile tip displacement. Since the inertia energy was small, the sum of the areas under the damping force and static force curves substantially equaled the area under the total measured force versus displacement (FIG. 4). Also, since the damping coefficient c was fixed for the whole displacement or time trace, changing the pile soil-stiffness in the later displacement segments substantially balanced the changes in damping energy in each of the latter segments. According to an embodiment of the first example study using the genetic algorithm, the quality of the match between the predicted and measured total forces and energies (FIGS. 2-4) was a function of the complexity of models considered, e.g., number of segments in the Q-Z curve, unloading stiffness, etc. Adding more segments would not only increase CPU time, but also would likely increase the uncertainty of estimated parameters, which may diminish the ability of embodiments of the present invention to provide a more efficient and unique solution.

Figure 5A:
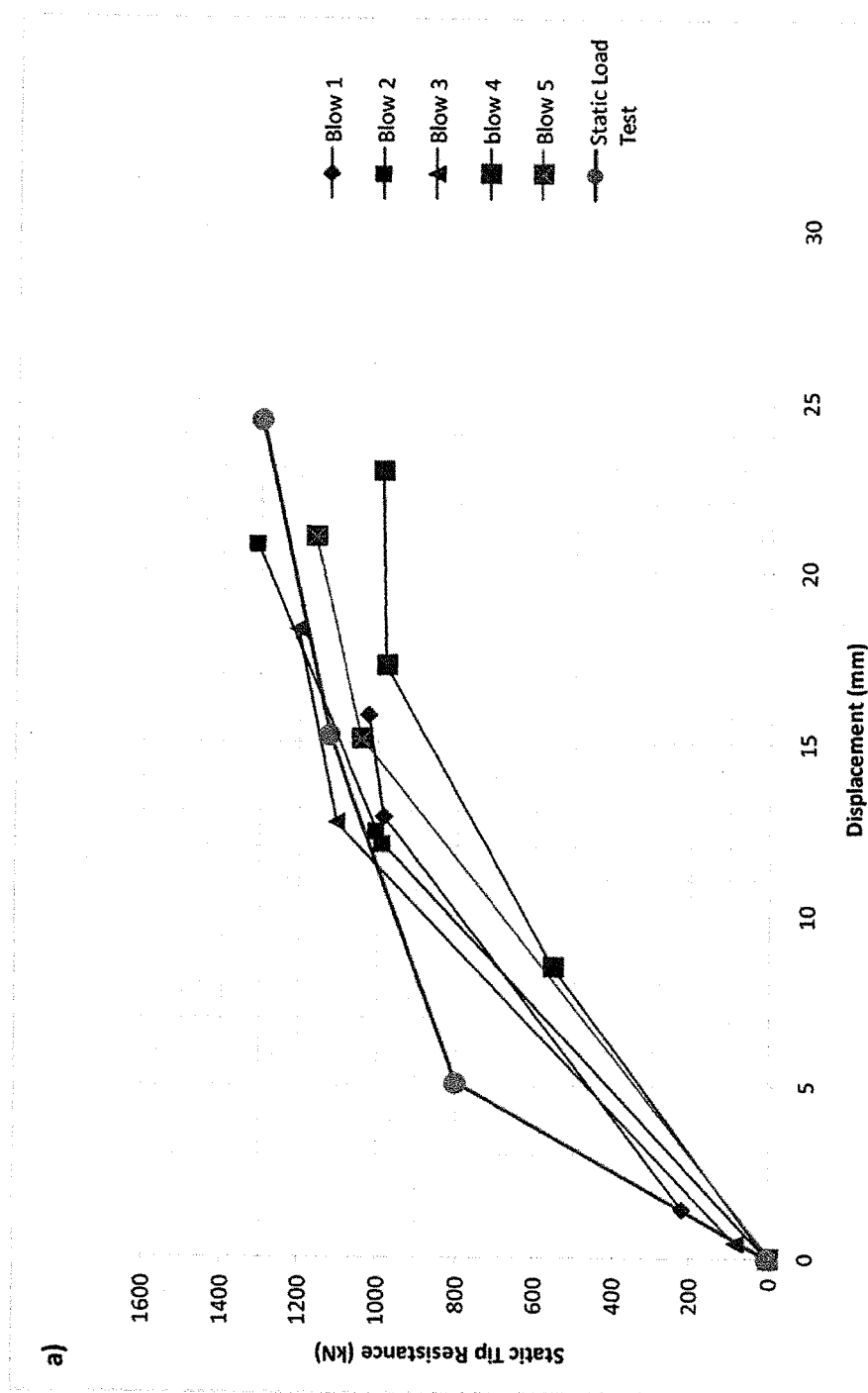
FIGS. 5a and 5b illustrate graphs of estimated tip resistance of a first pile before and after a load test during a first example study according to one embodiment of the present invention.
Figure 5B:
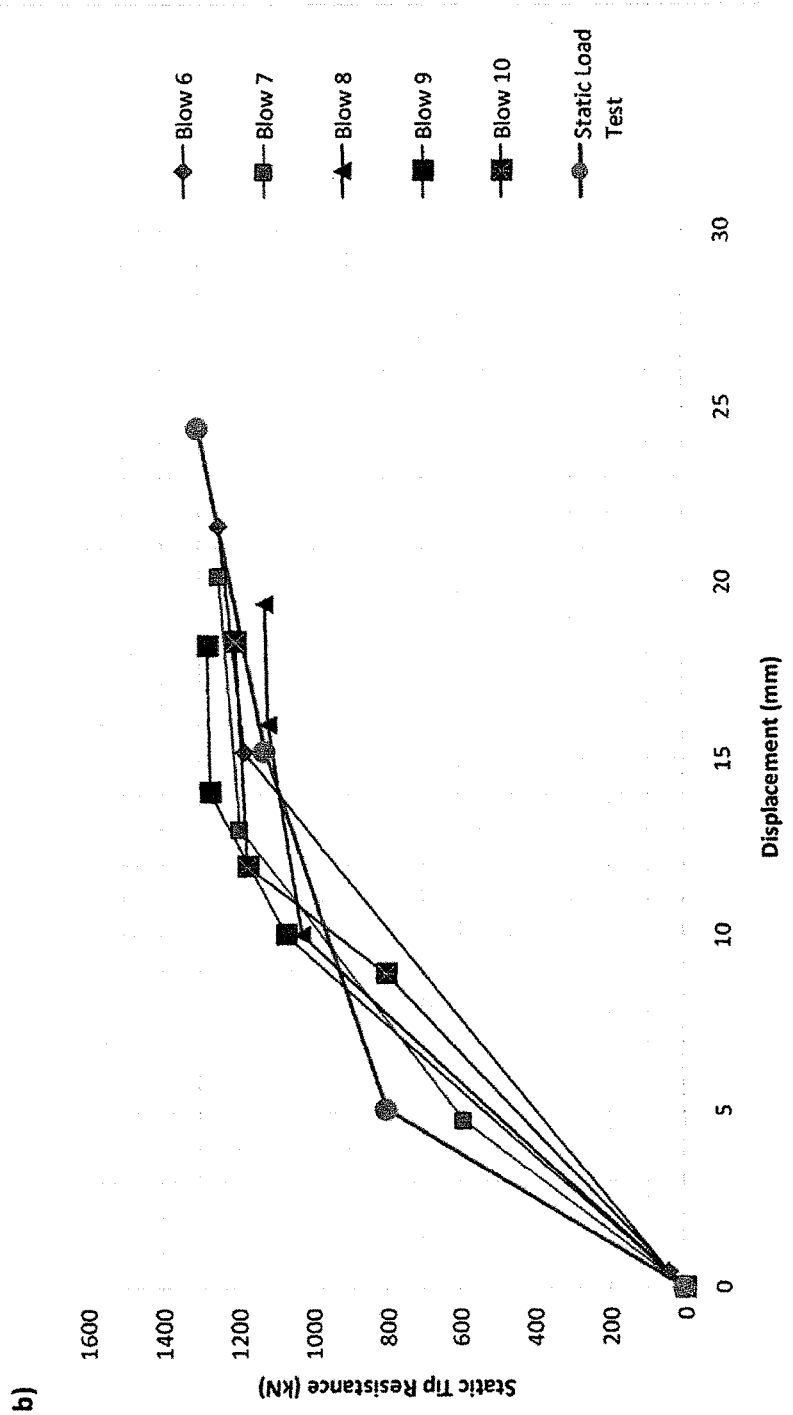

Inversion results of static tip resistance for five re-strike blows conducted during the first example study before the load test are presented together with the result of the static compression load test in FIG. 5a. The five estimated tip resistance curves are similar and compare favorably to measured static tip response, especially at large displacement. Similarly, the results of five re-strike blows after the load test are presented together with the result of the load test in FIG. 5b. The excellent agreement between the estimated resistances and that of the load test was again found. In addition, comparing the results in FIG. 5a against those in FIG. 5b, the differences of the estimated results of blows before and after the load test in this example study are small, suggesting little if any pile tip freeze.

Also of interest is mobilized tip resistance at displacements other than specified blow count values. For instance, from FIGS. 5a and 5b, considering Davisson capacity at the top of the pile, the mobilized tip resistance was approximately 900 to 1000 kN and occurred at 8 to 12 mm of tip displacement. The latter was less than the observed dynamic tip displacements, i.e., 15 to 25 mm, and their associated higher tip resistance, i.e., 1000 kN to 1400 kN. Therefore, knowing the static load versus displacement response of the tip may be useful for predicting the load transfer for other service or strength load cases in design.

Figure 6A:
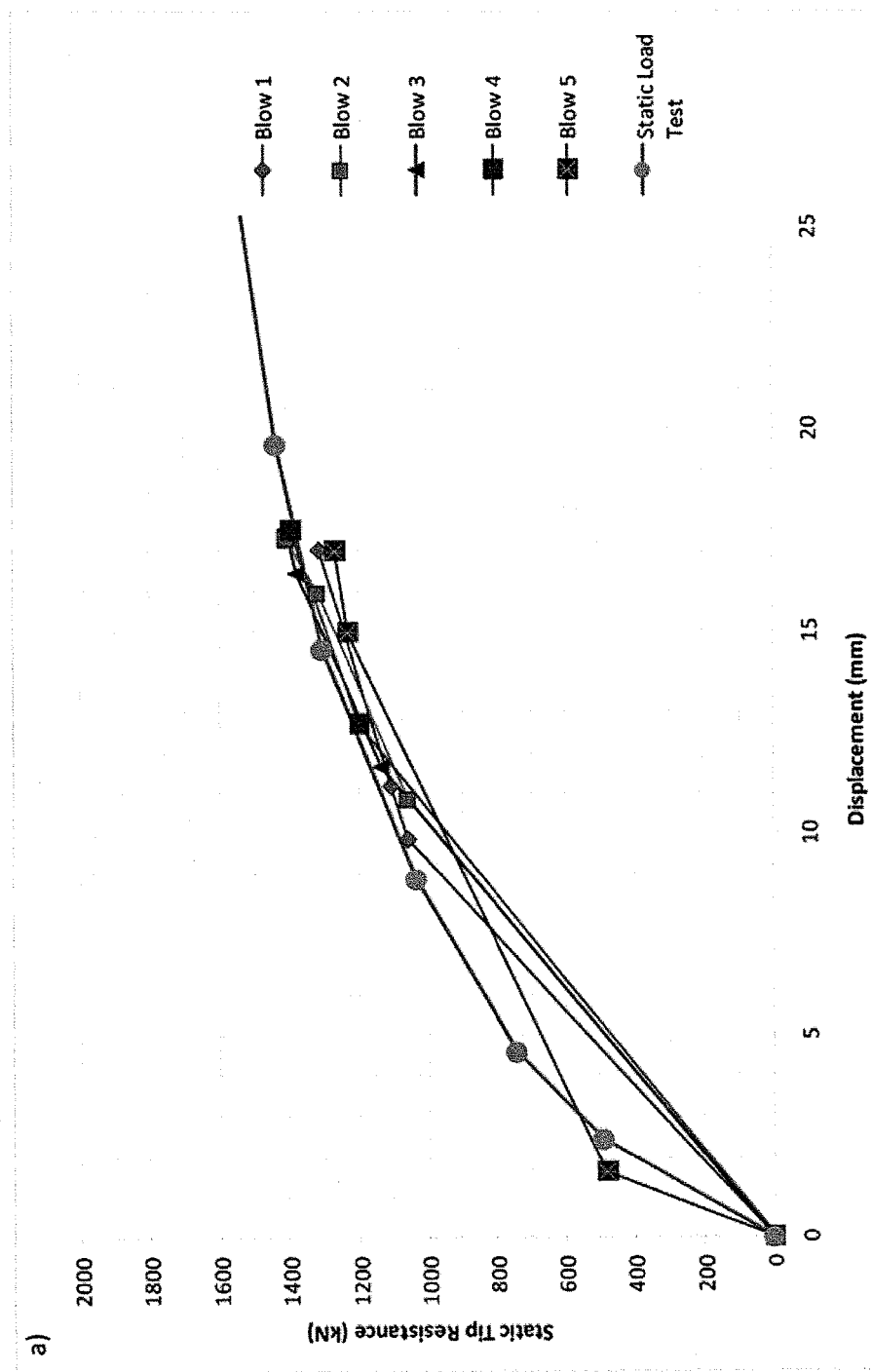
FIGS. 6a and 6b illustrate graphs of estimated tip resistance of a second pile before and after a load test during a first example study according to one embodiment of the present invention.
Figure 6B:
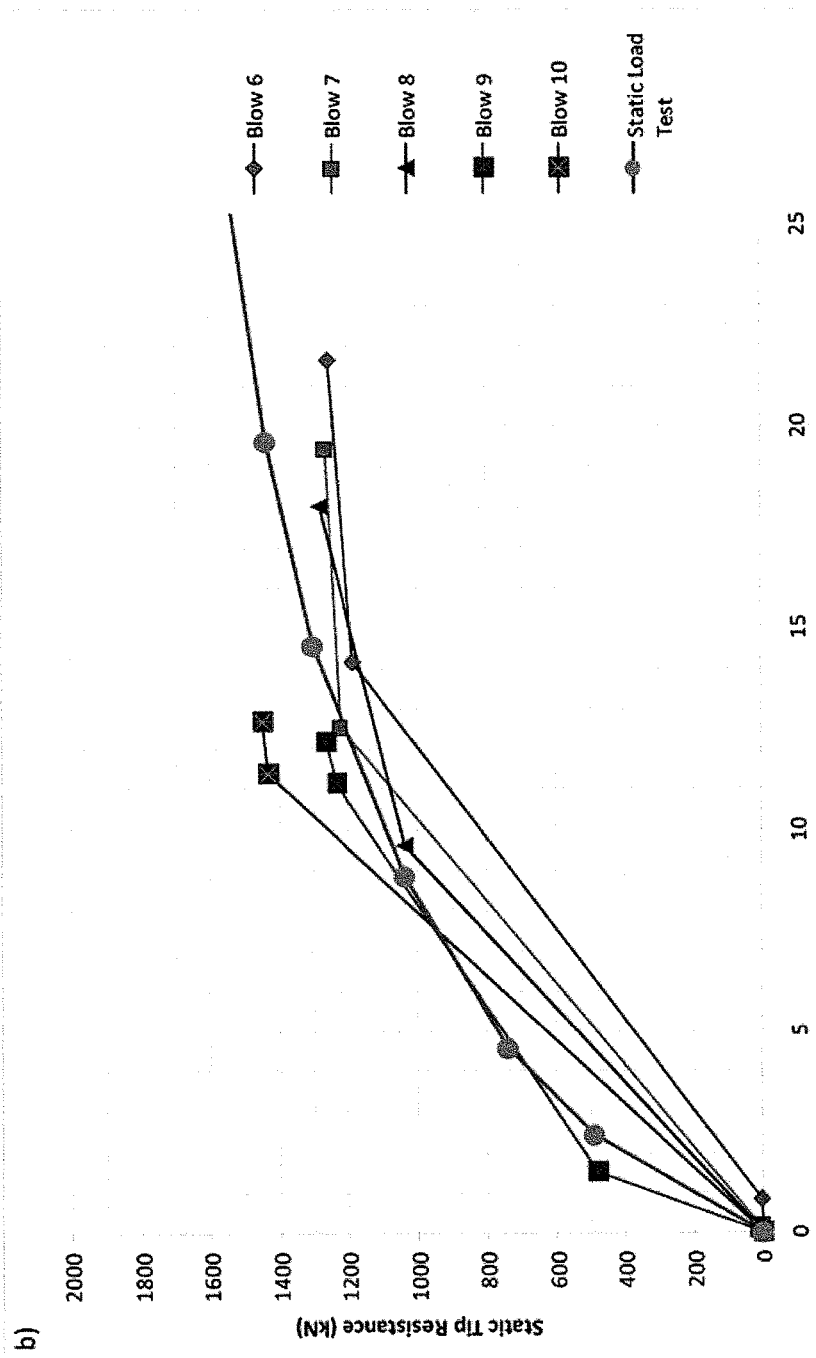

The second pile of this first example study site also involved a 0.61 m² pre-stressed, precast pile installed approximately 14 m below the ground surface. The static compression load test was conducted nine days after installation, and re-strike blows were also conducted three days before and four days after the load test. FIGS. 6a and 6b demonstrate the estimated static tip resistance (as determined by an example embodiment of the present invention) versus displacements for five blows before (three days prior) and five blows after (four days after) the static load test. Evident in these example results is the repeatability of the results for multiple blows and the favorable comparison to the static load test result, especially at large displacement.

b. Site 2

In the second example study, site 2 from which measured data were obtained is at Caminada Bay, La., 70 km south of New Orleans. The site consists of 10 m of silty fine sand with clay (standard penetration test (SPT) N~14) followed by 10 m of fine sand with silt (SPT N~24) and high plasticity on the plasticity index (PI) (40<PI<70) clays. The first pile (pile 1) analyzed during the second example study was a 0.76 m² pre-stressed, precast concrete pile driven 21 m below the ground surface (1 m into clay) using a single acting diesel hammer. Re-strikes were conducted seven days after installation, and the static compression load test was conducted two days after the re-strikes.

Figure 7:
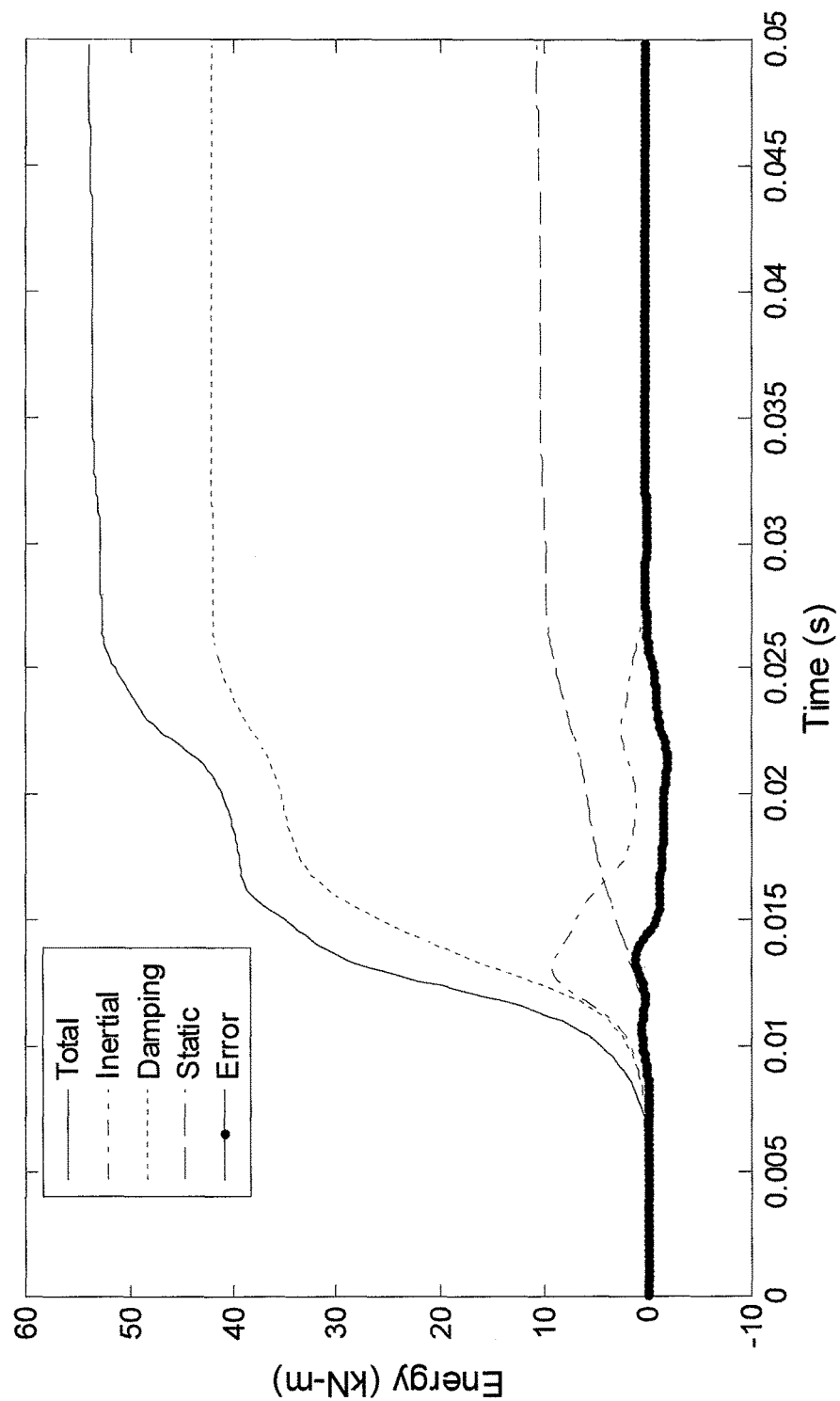
FIG. 7 shows a graph illustrating various component energy values related to a pile tip during a second example study according to one embodiment of the present invention.
Figure 8:
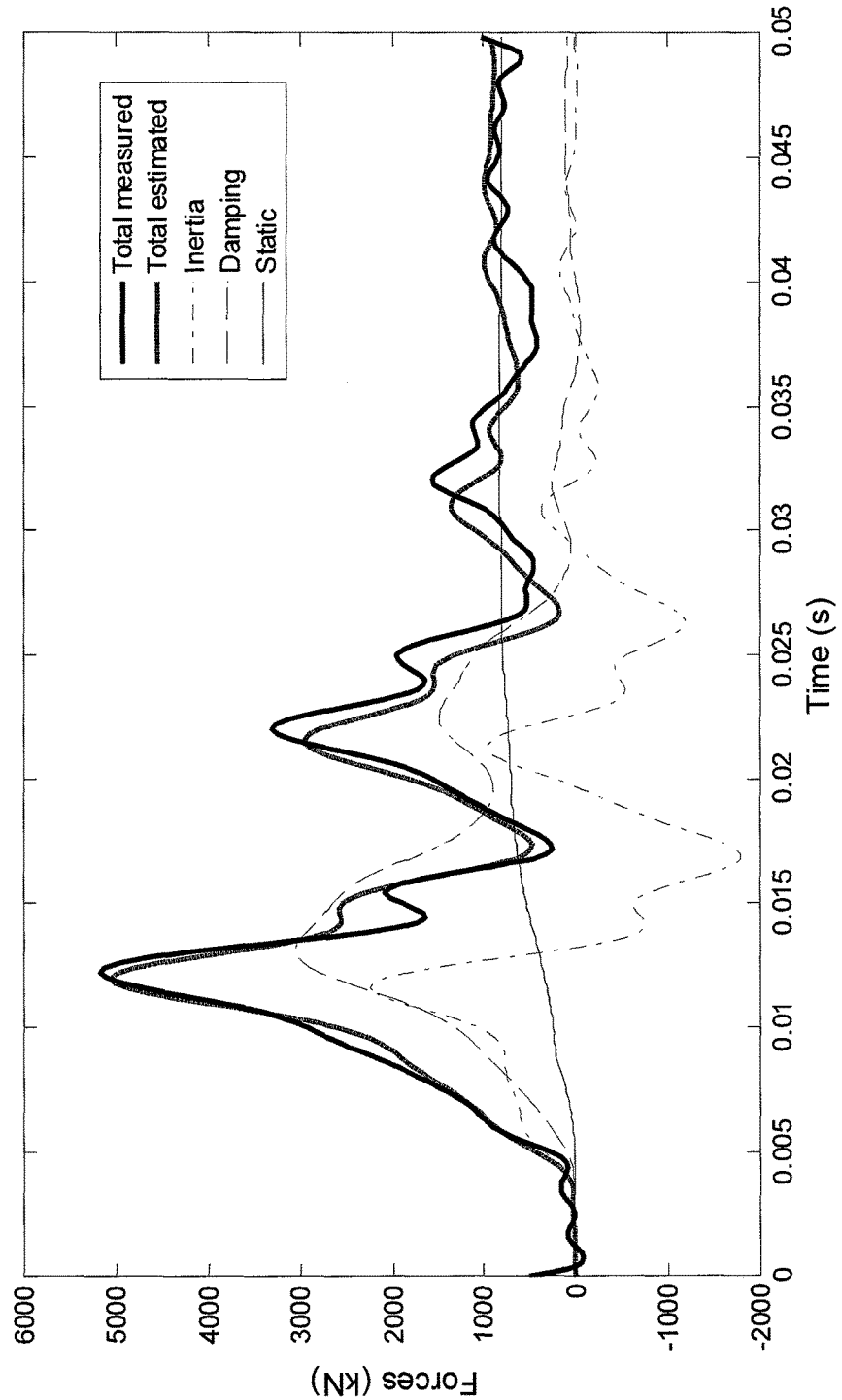
FIG. 8 shows a graph illustrating various component force values related to a pile tip during a second example study according to one embodiment of the present invention.

Various embodiments of the present invention were used on five of the end of drive (EOD) blows as well as five of the beginning of re-strike (BOR) blows to investigate changes of the tip resistance after a week (i.e., EOD vs. BOR) due to pile freeze. Similar to the Dixie Highway site of the first example study, the energy balancing and force matching for one blow are presented in FIGS. 7 and 8. In the case of the energy (FIG. 7), the small residual error represents a good match between the input energy and the energies associated with inertia, damping, and static resistance. Similarly, the total estimated and measured forces (strain data) at the pile tip (FIG. 8) match well for most of the points along the time axis. In the second example study, the total measured or predicted energy at the pile tip (inertia+damping+static) was three times smaller for the Caminada pile than that for the Dixie Highway piles, even though the pile was larger (D=0.76 m vs. 0.61 m) and moved equal to or greater than the Dixie Highway pile tip displacements for any blow. The inertia energy at the beginning of the blow was greater for the Caminada Bay pile than for the Dixie pile due at least in part to the added soil mass moving with the pile tip. After 0.028 sec, in the second example study, the total inertia energy was zero (again positive and negative contribution), and the total tip energy was balanced by damping and static tip resistance. Again, at discrete times (e.g., 0.28 sec and 0.38 sec) during the second example study, the velocity was zero, and static resistance substantially equaled total tip resistance. The sum of the damping and static energy after 0.28 sec substantially balanced the total supplied energy at the tip. Accordingly, both the damping and static resistance may be readily found.

Figure 9A:
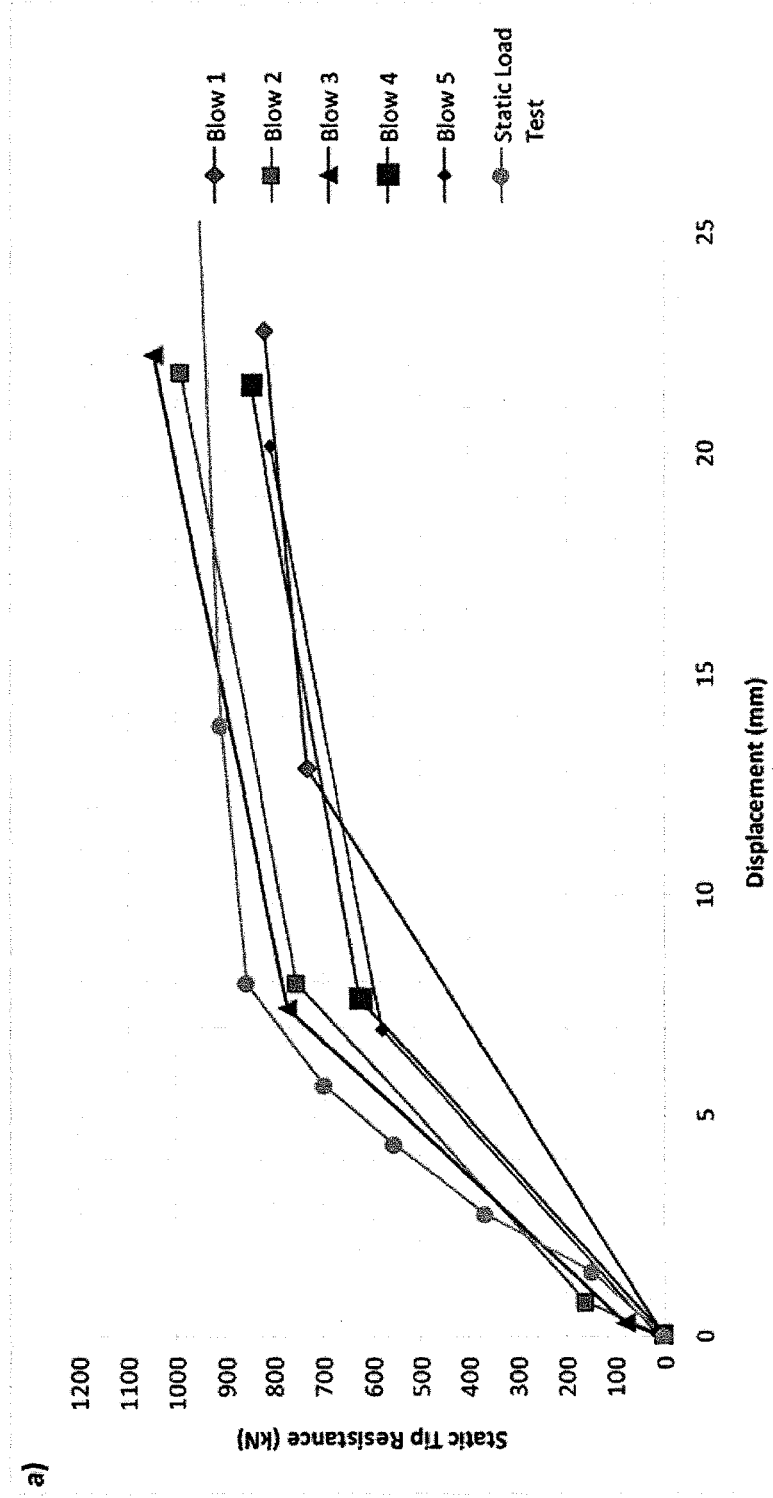
FIGS. 9a and 9b illustrate graphs of estimated tip resistance of a first pile before and after a load test during a second example study according to one embodiment of the present invention.
Figure 9B:
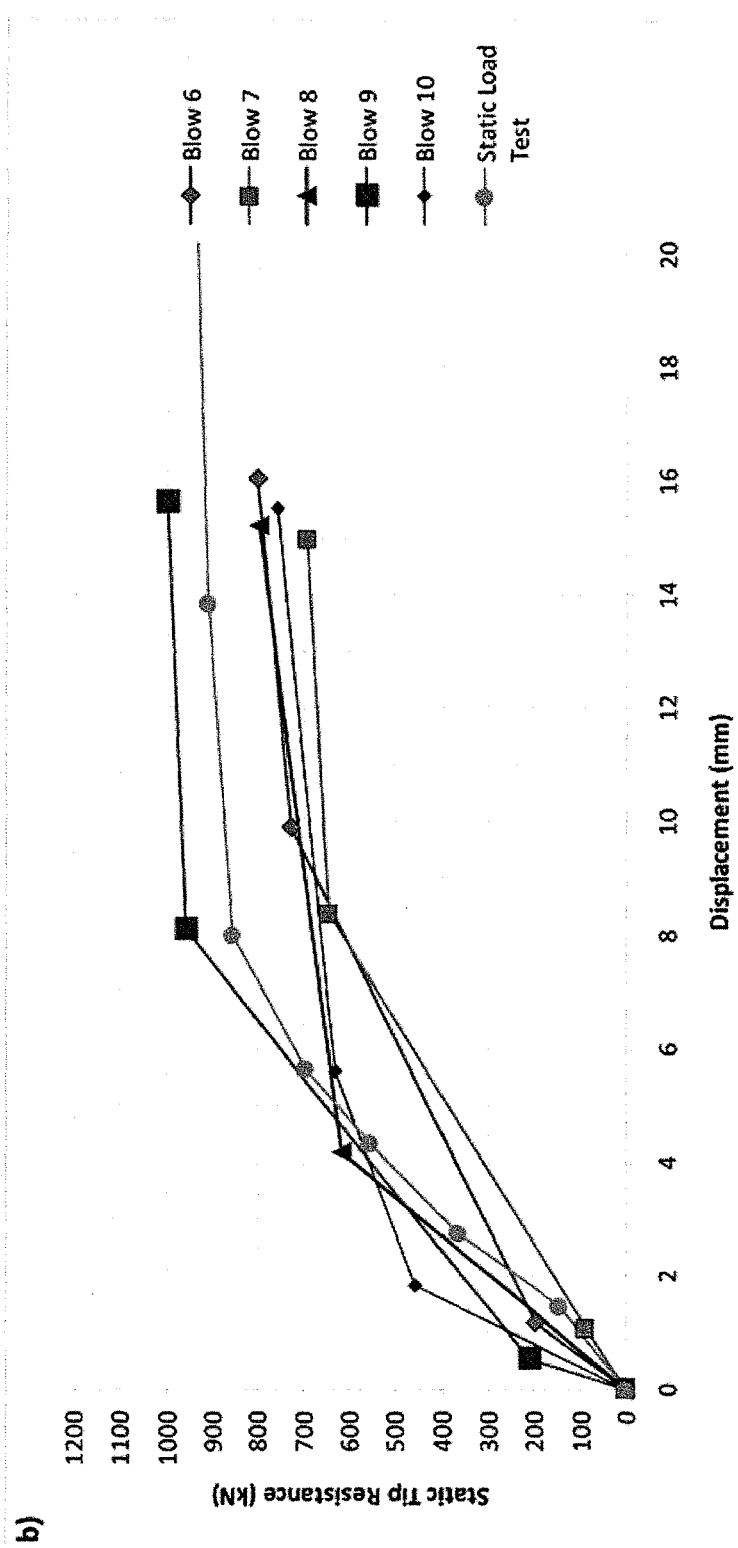

The predicted static tip resistance according to the second example embodiment for both EOD and BOR blows are shown in FIGS. 9a and 9b, respectively. FIG. 9a represents the static tip resistance for five blows at EOD and FIG. 9b represents the static tip resistance for five restrike blows (BOR), seven days after EOD. A comparison of the predicted static EOD response according to embodiments of the present invention versus BOR resistance shows an approximately 15 percent increase in the tip resistance after one week. Such an increase is consistent with other observations, which identified possible skin friction increases of 100 percent due to pore pressure or total stress changes but increases in tip resistance of less than 20 percent.

For comparison, the measured static tip response from a top down load test (nine days after EOD) is also shown in FIGS. 9a and 9b. As shown, the estimated tip resistances compare very favorably to the load test response. Assessing Davisson capacity on the static load test, the pile tip displaced 10 to 15 mm, which is much less than the maximum observed displacements (15 mm to 25 mm) of the EOD and BOR blows. In the displacement range of 10 mm to 15 mm, the pile capacity measured from the static load test was approximately 900 kN, which compared very favorably to the 800 kN predicted by the second example study from the average of the 10 blows analyzed.

Figure 10A:
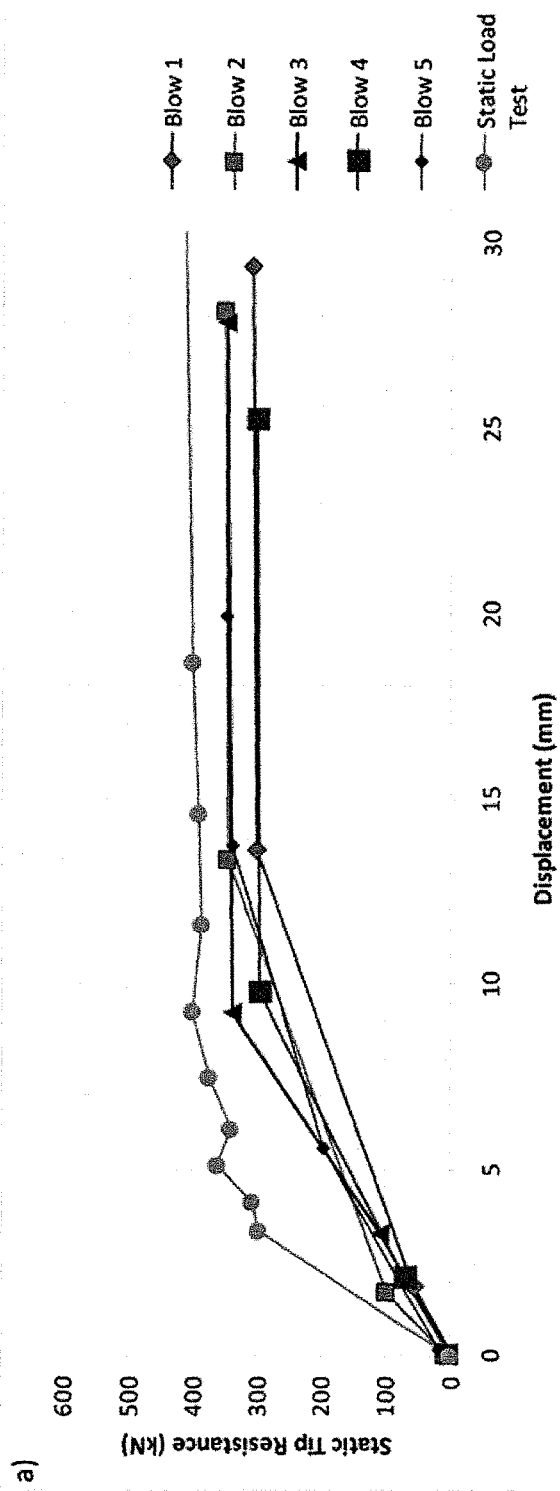
FIGS. 10a and 10b illustrate graphs of estimated tip resistance of a second pile before and after a load test during a second example study according to one embodiment of the present invention.
Figure 10B:
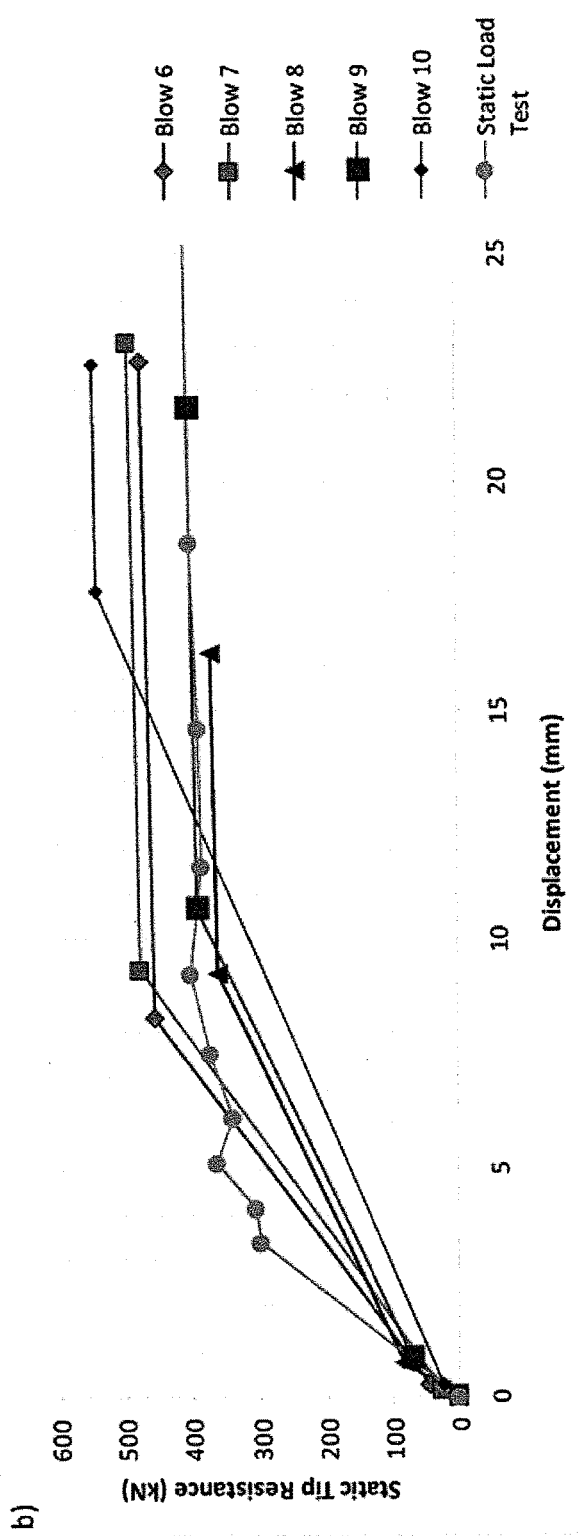

In the second example study, the second pile at the Caminada Bay site (pile 2) was also a 0.76 m² pre-stressed, precast concrete pile installed about 21 m below the ground surface. Re-strikes were conducted one month after installation, and the static compression load test was conducted two days after the re-strikes. The estimated tip resistance for five blows at EOD, and five blows at BOR, according to example embodiments of the present invention, are shown in FIGS. 10a and 10b, respectively. As seen from a comparison of the figures, the ultimate tip resistance increased by 18 percent one month after installation (i.e., from 340 kN over an average of five blows at EOD to 400 kN over an average of five blows at BOR). Again a load test was performed on the second pile and the static tip resistance versus displacement is also presented in FIGS. 10a and 10b. The predicted static resistance for all blows at BOR, according to example embodiments of the present invention, compares favorably with the measured static tip resistance.

IV. CONCLUSION

Various advantageous embodiments of the present invention are presented for estimating static tip resistance and damping at the bottom of a pile in "real time" using measured tip strain and acceleration data from a blow or impact. Certain advantageous embodiments use a nonlinear single degree of freedom to characterize the pile proximate the tip (e.g., below the gauges) and soil. According to one advantageous embodiment, a genetic algorithm may be employed to reduce the error in both energy and force equilibrium balance for the unknown parameters (mass, damping, and stiffness).

Non-limiting example studies were conducted according to various embodiments of the present invention on four driven piles for which conventional static load tests were performed. The piles varied in width, length, and embedded soil types (sands to silty-sands, tipped in clay and limestone). Analyses according to the example studies were performed both at EOD and BOR after various times (e.g., from one week up to a month). Good comparisons between the estimated static tip force versus displacement and the measured response from load tests were found. In addition, the static response at EOD vs. BOR differed less than 20 percent even after one month, suggesting that pile freeze, which was large (i.e., greater than 60 percent) in the example studies, may be largely attributed to skin friction. In addition, with estimated static tip force versus displacement determined according to various embodiments, estimated tip capacity (e.g., Davisson) may now be viable in the case of low blow counts (e.g., 10-20 blows) prior to penetration in the bearing layer. Finally, in some embodiments, it may be possible to monitor open ended large diameter concrete cylinder piles with the new pile tip gauges in order to separate out inertia (soil plug) from static tip resistance, which has shown to be a problem when monitoring with only top gauges.

Many modifications and other embodiments of the inventions set forth herein will come to mind to one skilled in the art to which these inventions pertain having the benefit of the teachings presented in the foregoing descriptions. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for making real time or near real time decisions regarding driving a dynamically-loaded component at least partially into a geological domain, wherein the dynamically-loaded component comprises a tip, the method comprising:
   receiving, by a receiver, gauge data from one or more gauges disposed proximate to the tip of the dynamically-loaded component, wherein (a) the gauge data represents measurements related to one or more impacts on the dynamically-loaded component, the one or more impacts at least partially driving the dynamically-loaded component into the geological domain, and (b) the one or more gauges comprise at least one of (i) one or more strain gauges or (ii) one or more accelerometers;
   determining, by a processor, measured data and estimated data corresponding to the one or more impacts on the dynamically-loaded component based at least in part on the gauge data, wherein (a) the one or more impacts at least partially drive the dynamically-loaded component into the geological domain, (b) the estimated data is determined based on model parameters, the model parameters comprising (i) a mass of the dynamically-loaded component and any soil plug associated with the tip, (ii) a viscous damping value, and (iii) a stiffness, and (c) selection of values for the model parameters is not informed by an initial model of the geological domain;
   performing, by the processor, an inversion to select the estimated data having the least amount of difference in comparison to the measured data, wherein performing the inversion comprises:
       applying a stochastic technique to determine a simultaneous global minimum in both a force difference and an energy difference, wherein (a) the force difference is the difference between an estimated force determined based on the estimated data and a measured force determined based on the measured data, (b) the energy difference is the difference between an estimated energy determined based on the estimated data and a measured energy based on the measured data, and (c) at least one of the force difference or energy difference is normalized so that the force difference and the energy difference are of the same magnitude; and
   determining the static tip resistance based at least in part on the selected estimated data in real or near real time with respect to the driving of the dynamically-loaded component;
   responsive to the determined static tip resistance failing to satisfy a predetermined threshold, continue driving the dynamically-loaded component; and
   responsive to the determined static tip resistance satisfying the predetermined threshold, cease driving the dynamically: loaded component.

2. The method of claim 1, wherein determining measured data further comprises:
   determining an amount of energy reaching the tip for each of the one or more impacts on the dynamically-loaded component; and
   determining an amount of force at the tip for each of the one or more impacts on the dynamically-loaded component.

3. The method of claim 2, wherein the amount of energy reaching the tip comprises an inertia energy, a damping energy, and a static energy; wherein the amount of force at the tip comprises an inertia force, a damping force, and a static force; and wherein the static tip resistance corresponds to the static force.

4. The method of claim 3, wherein determining estimated data further comprises:
   estimating one or more of the inertia energy, the damping energy, the static energy, the inertia force, the damping force, and the static force for each of the one or more impacts on the dynamically-loaded component.

5. The method of claim 1, wherein performing an inversion further comprises:
   generating one or more estimation models comprising estimated data;
   determining the difference between the measured data and the estimated data of each of the one or more estimation models; and
   selecting the estimated data from the estimation model having the least amount of error from the measured data.

6. The method of claim 5, wherein determining the difference between the measured data and the estimated data of each of the one or more estimation models further comprises:
   determining a first error between a measured amount of energy reaching the tip and an estimated amount of energy reaching the tip;
   determining a second error between a measured amount of force at the tip and an estimated amount of force at the tip; and
   combining the first error and second error.

7. The method of claim 6, wherein determining the difference between the measured data and the estimated data of each of the one or more estimation models comprises minimizing the difference based at least in part on a least squared error method.

8. The method of claim 6, further comprising:
   applying a normalizing coefficient to the measured amount of force at the tip and the estimated amount of force at the tip.

9. The method of claim 5, wherein generating one or more estimation models comprises:
   randomly generating one or more parameter values; and determining the estimated data for the estimation model based at least in part on the gauge data and the one or more parameter values.

10. The method of claim 9, wherein the one or more parameter values correspond to at least one of a mass, a viscous damping coefficient, one or more stiffnesses, and one or more segment lengths.

11. The method of claim 10, wherein each of the one or more stiffnesses corresponds to a respective one of the one or more segment lengths.

12. The method of claim 1 further comprising:
applying a low-pass filter to the measured data.

13. The method of claim 1, wherein the inversion comprises a global genetic inversion.

14. The method of claim 1, wherein the one or more gauges are embedded in the dynamically-loaded component proximate to the tip.

15. The method of claim 1, wherein the dynamically-loaded component comprises a driven pile or a cast in situ foundation.

16. A method for making real time or near real time decisions regarding driving of an object at least partially into a geological domain, the method comprising:
receiving, by a receiver, gauge data measured from an area proximate to a tip of the object resulting from one or more impacts on the object, the gauge data measured by one or more gauges disposed proximate to the tip of the object, wherein (a) the gauge data represents at least one of a total force and a total energy associated with each of the one or more impacts, (b) the one or more impacts at least partially drive the object into the geological domain, and (c) the one or more gauges comprise at least one of (i) one or more strain gauges or (ii) one or more accelerometers;
generating, by a processor, a plurality of estimation models comprising one or more estimated component values of the gauge data for each respective impact, wherein (a) the estimated models are generated based on model parameters, the model parameters comprising (i) a mass of the object and any soil plug associated with the tip, (ii) a viscous damping value, and (iii) a stiffness, and (c) selection of values for the model parameters is not informed by an initial model of the geological domain;
performing, by the processor, an inversion on the measured data and the estimated component values, wherein performing the inversion comprises:
applying a stochastic technique to determine a simultaneous global minimum in both a force difference and an energy difference, wherein (a) the force difference is the difference between an estimated force determined based on the estimated data and a measured force determined based on the measured data, (b) the energy difference is the difference between an estimated energy determined based on the estimated data and a measured energy based on the measured data, and (c) at least one of the force difference or energy difference is normalized so that the force difference and the energy difference are of the same magnitude;
selecting, by the processor, one of the estimation models, wherein the total of the one or more estimated component values of the selected estimation model has the least amount of difference from the measured data of the plurality of estimation models;
determining, by the processor, the static tip resistance based at least in part on the selected estimated data in real or near real time with respect to the driving of the dynamically-loaded component;
responsive to the determined static tip resistance failing to satisfy a predetermined threshold, continue driving the dynamically-loaded component; and
responsive to the determined static tip resistance satisfying the predetermined threshold, cease driving the dynamically-loaded component.

17. A system for making real time or near real time decisions regarding driving of a dynamically-loaded component at least partially into a geological domain, wherein the dynamically-loaded component comprises a tip,
the system comprising: at least one gauge disposed proximate to the tip of the dynamically-loaded component, the at least one gauge comprising at least one of (a) at least one strain gauge or (b) at least one accelerometer, the at least one gauge configured to capture gauge data representing measurements related to one or more impacts on the dynamically-loaded component;
a transmitter in communication with the at least one gauge, the transmitter configured to transmit the gauge data measured by the at least one gauge, wherein the gauge data corresponds to one or more impacts on the dynamically-loaded component;
a receiver configured to receive the gauge data from the at least one gauge; and
a processor in communication with the receiver configured to:
determine measured data and estimated data corresponding to the one or more impacts on the dynamically-loaded component based at least in part on the received gauge data, wherein (a) the estimated data is determined based on model parameters, the model parameters comprising (i) a mass of the dynamically-loaded component and any soil plug associated with the tip, (ii) a viscous damping value, and (iii) a stiffness, and (b) selection of values for the model parameters is not informed by an initial model of the geological domain,
perform an inversion to select the estimated data having the least amount of difference in comparison to the measured data by applying a stochastic technique to determine a simultaneous global minimum in both a force difference and an energy difference, wherein (a) the force difference is the difference between an estimated force determined based on the estimated data and a measured force determined based on the measured data, (b) the energy difference is the difference between an estimated energy determined based on the estimated data and a measured energy based on the measured data, and (c) at least one of the force difference or energy difference is normalized so that the force difference and the energy difference are of the same magnitude,
determine the static tip resistance based at least in part on the selected estimated data in real or near real time with respect to the driving of the dynamically-loaded component, wherein the one or more impacts at least partially drive the object into a geological domain and the inversion does not use an initial model of the geological domain, and
responsive to the determined static tip resistance failing to satisfy a predetermined threshold, continue driving the dynamically-loaded component; and responsive to the determined static tip resistance satisfying the predetermined threshold, cease driving the dynamically-loaded component.

\* \* \* \* \*

UNITED STATES PATENT AND TRADEMARK OFFICE
CERTIFICATE OF CORRECTION

PATENT NO. : 9,995,643 B2
APPLICATION NO. : 13/982045
DATED : June 12, 2018
INVENTOR(S) : McVay et al.

Page 1 of 1

It is certified that error appears in the above-identified patent and that said Letters Patent is hereby corrected as shown below:

In the Claims

<u>Column 16</u>
Line 13, "dynamically: loaded" should read --dynamically-loaded--

Signed and Sealed this
Eighteenth Day of September, 2018

Andrei Iancu
*Director of the United States Patent and Trademark Office*